(12) United States Patent
Huang et al.

(10) Patent No.: US 8,181,535 B2
(45) Date of Patent: May 22, 2012

(54) FLOW MEASURING APPARATUS USING TUBE WAVES AND CORRESPONDING METHOD

(75) Inventors: Songming Huang, Hardwick (GB); Gary Oddie, St. Neots (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 153 days.

(21) Appl. No.: 12/524,654

(22) PCT Filed: Mar. 20, 2008

(86) PCT No.: PCT/GB2008/000999
§ 371 (c)(1),
(2), (4) Date: Mar. 18, 2010

(87) PCT Pub. No.: WO2008/117030
PCT Pub. Date: Oct. 2, 2008

(65) Prior Publication Data
US 2010/0192703 A1    Aug. 5, 2010

(30) Foreign Application Priority Data
Mar. 23, 2007   (GB) .................................. 0705562.7

(51) Int. Cl.
*G01F 1/66*   (2006.01)
(52) U.S. Cl. ................................. 73/861.25
(58) Field of Classification Search ... 73/861.25–861.28
See application file for complete search history.

(56) References Cited

U.S. PATENT DOCUMENTS

| | | | |
|---|---|---|---|
| 3,575,050 A * | 4/1971 | Lynnworth | ............... 73/861.27 |
| 4,445,389 A | 5/1984 | Potzick et al. | |
| 4,628,725 A | 12/1986 | Gouilloud et al. | |
| 4,735,097 A | 4/1988 | Lynnworth | |
| 4,838,127 A | 6/1989 | Herremans et al. | |
| 4,882,934 A | 11/1989 | Leffert et al. | |
| 4,970,902 A * | 11/1990 | Misumi et al. | ............. 73/861.23 |
| 5,533,408 A | 7/1996 | Oldenziel et al. | |
| 5,918,281 A * | 6/1999 | Nabulsi | ........................... 73/597 |
| 7,373,840 B2 * | 5/2008 | Kamimura | ................. 73/861.27 |
| 2006/0109141 A1 | 5/2006 | Huang et al. | |
| 2010/0095782 A1 * | 4/2010 | Ferencz et al. | ............. 73/861.28 |

FOREIGN PATENT DOCUMENTS

| | | |
|---|---|---|
| EP | 0212470 A2 | 3/1987 |
| GB | 2400439 A | 10/2004 |
| GB | 2442026 A | 3/2008 |

(Continued)

OTHER PUBLICATIONS

Search and Examination Report of British Application Serial No. 0705562.7 dated Jul. 20, 2007.

(Continued)

*Primary Examiner* — Jewel V Thompson

(57) ABSTRACT

Methods of measuring flow properties and flowmeters having an upstream transceiver and a downstream wave transceiver, each positioned with a wave emitting surface exposed to a fluid flowing in a conduit are described, the transceiver being separated by a length L along the conduit and adapted to receive wave signals traveling in flow direction and opposite to the flow direction, respectively, and an electronic processor for extracting from travel time measurements of the wave signals flow characterizing parameters, the transceivers being adapted to generate tube waves, particularly in the audible frequency range, in the conduit and used to determine the travel time of the tube waves between the upstream transceiver and the downstream wave transceiver.

26 Claims, 4 Drawing Sheets

FOREIGN PATENT DOCUMENTS

| | | | |
|---|---|---|---|
| WO | 2004085796 A1 | 10/2004 |
| WO | 2005024182 A1 | 3/2005 |

OTHER PUBLICATIONS

International Search Report of PCT Application Serial No. PCT/GB2008/000999 dated Jun. 20, 2008.

Shahid Qureshi, "Adaptive Equalization: High speed data transmission over voice band telephone lines," IEEE Communications Magazine, Mar. 1982: pp. 9-16.

Tor K. Kragas et al., "Downhole Fiber-Optic Flowmeter: Design, Operating Principle, Testing, and Field Installations," Society of Petroleum Engineers, Production & Facilities, Nov. 2003: pp. 257-268.

J. S. Gudmundsson et al., "Gas-Liquid Metering Using Pressure-Pulse Technology," Society of Petroleum Engineers, 1999 SPE Annual Technical Conference and Exhibition, Oct. 1999: pp. 1-10.

Ernest O. Doebelin, "Measurement Systems: Application and Design," New York: McGraw-Hill Publishing Company, 1990: pp. 589-591.

* cited by examiner

FLOW MEASURING APPARATUS USING TUBE WAVES AND CORRESPONDING METHOD

The present invention relates to an apparatus and method for the determination of one or more characteristics of a flowing fluid. In particular, the present invention is concerned with the determination of the flow rate of a flowing fluid, such as a fluid which may be encountered in hydrocarbon well boreholes.

BACKGROUND OF THE INVENTION

Knowledge of the flow rate of fluid in hydrocarbon well boreholes is important for monitoring and controlling fluid movement in the well and reservoir. Typically, in such hydrocarbon wells, the fluid flowing along the borehole includes a hydrocarbon (e.g. oil) and water. Each zone of the reservoir may have a valve to control the fluid inlet from that zone. By monitoring the flow rates of oil and water coming from each zone, the flow rate of oil can be optimised by control of the valves. In this way, the water cut may be minimised for example.

A flow meter installed in piping in a hydrocarbon well borehole is subject to several design restrictions which may not apply to flow meters based on the surface. For instance, a downhole flowmeter should be able to operate relatively maintenance-free, due to the remoteness of its location. The flow meter should be able to cope with non-mixed and mixed flow regimes over a wide range of total flow rate and cut. Furthermore, the flow meter should not be sensitive to its orientation.

It is also often necessary to monitor or analyze the formation rock and the condition of piping and other components within the borehole. Measurements for this determination are usually taken by passing data logging tools along the pipeline. Such tools are dimensioned to pass along standard pipe sizes. Thus a flow meter for use downhole should be adapted to allow the unobstructed passage of logging tools.

In non-mixed flow (such as stratified flow) the oil phase velocity and the water velocity are usually different. The difference in velocity is the phase slip. The volume fraction of water (holdup) must be measured in order to determine the flow rate of water, and similarly for the flow rate of oil. Thus, the determination of flow rate for a two-phase flow can be significantly more complex than for a single phase flow, and usually attempts are made to mix the flow before flow rate measurements are taken.

In so-called "three-phase" flow, gas is present in a mixture of water and oil. The present of gas poses further problems when establishing exact flow-rates and hold-ups. Gas usually has properties significantly different from oil and water, thus limiting the scope of many methods suitable for liquid-only flows.

In many downhole applications, such as drill stem testing (DST), the flow to be measured can range from single-phase, such as oil or gas flow, to multi-phase such as oil/gas/water three-phase flows. In some cases, solid particles may exist in the flow. The inclination of the well may also vary widely, from vertical, through deviated to horizontal. The combination of multi-phase flow with various inclinations leads to complex flow regimes, which should be taking into account when developing a down-hole flow meter.

Under down-hole environment, the pressure of the fluid is likely to be high. Therefore, for an oil well, the percentage of gas in the flow should be much less than that encountered in the application of surface flow metering. Also at down-hole, the density of the gas is high whereas the speed of sound in gas also increases due to the elevated temperature; such a combination leads to a reduced contrast between the acoustic impedance of the liquid phase and that of the gas phase.

A down-hole multi-phase flowmeter needs, ideally, to measure the flow rates of all the phases of interest. Volumetric flow rate of a particular phase can be obtained by measuring directly the velocity and fraction of that phase. Some times a phase velocity may be derived from some other indirect measurements if these are easier to implement than a direct measurement.

For instance, if the oil velocity in a gas/oil flow is difficult to measure directly, whereas it is possible to measure a mixture or homogeneous velocity of the fluid plus the gas fraction and gas velocity, then the liquid velocity can be derived according to:

$$V_h = (1-\alpha_g) \cdot V_o + \alpha_g \cdot V_g \qquad [1]$$

where $V_h$ is the homogeneous velocity, $V_o$ the oil velocity, $V_g$ the gas velocity and $\alpha_g$ the gas fraction. If one has a slip velocity model, say $V_g/V_o=k$, where k is known, then the oil velocity may be derived from Eq. 1, even without the measurement of $V_g$.

One of the general flow metering technologies particularly relevant to this invention is the ultrasonic flow meter based on the transit time measurement principle such as described for example by Doebelin E. O, "Measurement Systems—applications and design", 4$^{th}$ edition, McGraw-Hill, 1990, Chapter 7, pp. 589-591 [1] or the U.S. Pat. Nos. 4,735,097 (or EP-A-0212470); 4,838,127 or 5,533,408.

There are many versions of such flow meter available commercially. However the basic measurement principle is similar—an acoustic pulse of ultrasonic frequency is transmitted in the fluid, firstly in the direction along the flow and then in the reverse direction against the flow. The pulse propagation times from the transmitter to the receiver are measured for pulses traveling in both directions. These time-of-flight measurements are then combined with the know separation distance between the transmitter and the receiver to produce the flow velocity. The drawback of such a flowmeter is that it is only applicable to near single-phase flows. This is because at ultrasonic frequency, the wavelength in the fluid is short, and the wave is thus seriously attenuated and dispersed in a multi-phase flow by the presence of bubbles/droplets of one flow phase in another.

Another relevant flow metering method is the pressure pulse method described by Gudmundsson and Celius in: Gudmundsson J. S. and Celius H. K, "Gas-Liquid Metering Using Pressure Pulse Technology", paper SPE56584, presented at the 1999 SPE Annual Technical Conference and Exhibition, Houston, 3-6 October. In their method, a quick-closing valve is used to choke the flow, and the pressure increase due to the water-hammer effect is measured. This pressure change also creates a pressure pulse wave with very low frequency (<10 Hz), which propagates backwards towards the upstream of the flowline. The speed of sound in the flow can be measured from the traveling speed of this propagating wave. The speed of sound can be used to determine the phase fraction, such as gas void fraction, in a two-phase flow through correlations well documented in the literature as cited above.

The magnitude of the pressure change can be combined with the measured speed of sound to produce a mass flow rate measurement for the mixture flow. This method has been used on surface pipes near the wellhead to meter gas/oil flows. The main drawback is the need to choke the flow with a quick closing valve, which is often not permitted for down-hole applications such as the DST.

Kragas et al. described an optical fiber based down-hole flowmeter in: Kragas T. K., Bostick III F. X., Mayeu C., Gysling D. L. and van der Spek A. M., "Down-hole Fiber-Optic Flowmeter: Design, Operating principle, Testing, and Field Installations", paper SPE 87086, first presented at the 2002 SPE Annual Technical Conference and Exhibition, San Antonio, Tex., 29 September-2 October.

The basic principle of the fiber-based device relies on passive acoustic signal sensing and analysis. First, it used a fiber-optical acoustic sensing array to detect the acoustic signals generated naturally in the flow and measure the speed of such acoustic signal propagating along the borehole. Since these signals are of low frequency (long wavelength) nature, the speed of sound can be used to determine the phase fraction in a two-phase mixture. Second, discontinuous or non-uniform structures in the multi-phase flow produce acoustic signatures that can be detected by the fiber-optical sensor as they pass the sensor. Therefore with two sensors separated by a known distance, the travel velocity of such structures can be determined by, say, a cross-correlation measurement. This cross-correlation velocity is treated as the homogeneous velocity of the flow.

The drawbacks with this flowmeter are: first, the passive acoustic method is not reliable if the flow is nearly single-phase, as it sometimes is in down-hole applications; second, the travel velocity of the non-uniform structures, from our experience in down-hole flow meters, cannot be always equalized to the homogeneous velocity, particularly at low velocities and in highly deviated wells. The cross-correlation based method also will not work in single-phase flows where the non-uniform structures do not exist.

With the known methods and apparatus in view, the present invention proposes to provide a measurement of flow characteristics, such as the homogeneous velocity, in a downhole flow. Ideally the apparatus is non-intrusive in allowing an unrestricted passage of the downhole flow through the apparatus.

SUMMARY OF THE INVENTION

The invention describes a flowmeter for down-hole applications that overcomes the drawbacks of the existing methods.

According to a first aspect of the invention this flowmeter is based on an actively generated tube wave mode that has a wavelength that is considerably greater than the diameter of the flow pipe and the sizes of the non-uniform multi-phase structures. Two time-of-flight measurements, one for the wave traveling with the flow and one for that traveling against the flow, are measured, and these are further processed to give two outputs—the homogeneous velocity of the flow and the speed of sound in the fluid. The speed of sound, depending on the nature of the flow, can be interpreted to give a phase fraction, e.g. gas void fraction, in the flow.

The flowmeter in accordance with the invention has an upstream transceiver or upstream array of wave transceivers and a downstream wave transceiver or downstream array of wave transceivers, each positioned with a wave emitting surface exposed to a fluid flowing in a conduit, the transceiver being separated by a length L along the conduit and adapted to receive wave signals traveling in flow direction and opposite to the flow direction, respectively, and an electronic processor or microprocessor or other signal processing and computational devices for extracting from travel time measurements of the wave signals flow characterizing parameters.

The transceivers or array of transceivers for the purpose of this invention are adapted to generate tube waves in the conduit and to determine the travel time of the tube waves between the upstream transceiver and the downstream wave transceiver. A transceiver is usually understood as a combined transmitter and receiver, however for the purpose of the present invention a transceiver may be replaced by a combination of a receiver and a reflector, such as a Helmholtz resonator as described below. The reflector can thus replace either the upstream or downstream transmitter.

Tube waves are understood to be preferably acoustic waves with a wavelength sufficiently long to behave as plane waves guided by the conduit. Tube wave can be interpreted as waves with wavefronts essentially perpendicular to the wall of the conduit.

In a preferred embodiment, the wave-emitting surfaces are compliant so as to reduce the impedance mismatch between the fluid and the transceiver by for example mounting the transceiver onto a compliant membrane structures surface as described in the co-owned pending United Kingdom patent application 0618305 filed 19 Sep. 2006, fully incorporated herein by reference.

The waves preferably generated have a frequency in the audible acoustic frequency range, i.e., preferably in the frequency range of 10 Hz-5 KHz. The wavelength of the waves is preferably in the range of 1 to 100 times, more preferably 1 to 10 times, the characteristic width of the conduit. The characteristic width is the longest distance across the conduit perpendicular to the wall. For a circular pipe the characteristic width is known as diameter. The conduits of the'present invention are preferably conduits located in a subterranean wellbore and have a preferred characteristic width of the conduit is between 2 cm and 50 cm.

In a preferred embodiment of the invention, the section of the conduit between the location of the upstream and downstream transceivers is isolated from noise passing through the conduit. Rather than attempting a broadband noise cancellation, in a preferred embodiment the flowmeter is located between narrowband acoustic filters such as Helmholtz resonator filters. The isolation or filtering can be done on one, side of the flowmeter arrangement only.

In case the upstream or downstream transceivers are arrays of transceivers, noise in the frequency band of interest of the flowmeter can be reduced by introducing delays into the wave emission of the respective array elements. The delay can be tuned to suppress by destructive interference the wave signals traveling out of the flowmeter section. Whilst this embodiment does not reduce the invasion of ambient noise into the flowmeter section as the filters above do, it reduces the amount of potential reflection of the original wave signals. These reflections as being exactly in the frequency range of interest can contribute disproportionately to noise which distorts the actual measurement.

In a preferred variant of this embodiment the delay is at least in regular or irregular time intervals re-calculated and thus adapted to an actual (bulk) sound velocity in the conduit.

In a more preferred variant the above noise reducing variants are combined to an embodiment which isolates the flowmeter section from self-generated noise due to reflection using destructive interference and from this or other noise sources using narrow band-stop filters.

This basic system according to the invention can be combined with other sensors, e.g. water-liquid-ratio sensors, and flow models, e.g. gas slip model to produce a complete multiphase flowmeter.

This flowmeter is preferably full-bore with essentially non-intrusive transmitters and receivers, allowing intervention access through the metering section. It has no moving parts and generates little pressure drop across it.

These and further aspects of the invention are described in detail in the following examples and accompanying drawings.

BRIEF DESCRIPTION OF THE DRAWINGS

The invention will now be described, by way of example only, with reference to the accompanying drawings, of which.

DETAILED DESCRIPTION

Figure 1:
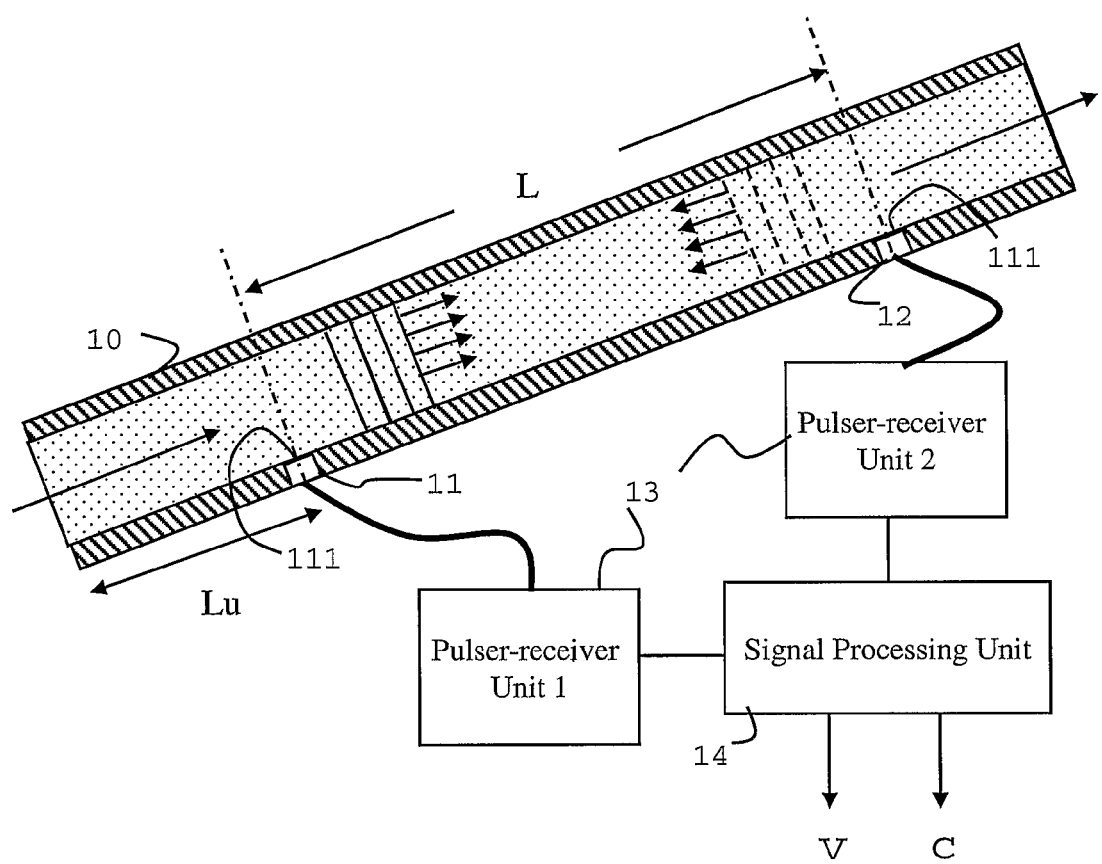
FIG. 1 illustrates a basic variant of a flowmeter in accordance with the present invention.

A first embodiment of the invention is shown in FIG. 1. At least two acoustic transceivers 11,12 (a single device used as either the transmitter or the receiver) are mounted on a flow-conveying pipe 10. The two acoustic transceivers 11, 12 are separated by a known, distance, denoted L. The two acoustic transceivers 11,12 are mounted such that acoustic energy can be emitted directly into the fluid in the pipe 10. Thus, in this embodiment the active sound-emitting faces 111 of the transceivers are in direct contact with fluid in the pipe. The active elements are acoustically isolated from the surrounding pipe wall, so that the acoustic energy generated by a transmitter 11,12 is mostly coupled into the fluid in the pipe bore, rather than into the wall of the pipe.

The acoustic isolation can be readily achieved using a material that provides a significant impedance step to either the material of the transducer or the pipe wall material or both. A rubber or other polymeric material can be used for this purpose.

Each of the transceiver is connected with a pulse-echo electronics unit 13. A transceiver works either in the transmission mode or in the receiving mode. In the transmitting mode, the pulse-echo unit applies an electrical energizing pulse to the transceiver that in turn generates an acoustic pulse in the fluid. The frequency range of the energizing pulse is selected such that the wavelength of the acoustic energy is significantly greater than the diameter of the pipe. For instance, for a down-hole gas/oil flow, where the speed of sound may range from 250 m/s, at gas fraction of 20%, to 1400 m/s at 0% gas, at a driving frequency of 500 Hz, the minimum wavelength would be 0.5 m. For a flow pipe with an inner diameter of 3", this minimum wavelength is 6.7 times of the pipe diameter. This long wavelength ensures a tube wave mode, which is like a plane wave guided by the pipe bore, is generated.

In a typical measurement process, the two transceivers 11,12 can be energized both as transmitters at the same time, and then both switched to the receiving mode to acquire the tube wave signals arriving from the other transmitter.

Alternatively, the two transceivers 11,12 can be energized one at a time. For instance, the upstream transceiver 11 is the transmitter first activated. After the downstream transceiver 12 receives the transmitted signal, it then turns into the transmitter and upstream transceiver 11 becomes the receiver. This process can be repeated. The exact arrangement of timing for the energizing and receiving process depends on the separation between the two transceivers 11,12, and on the distances between the transceivers and any acoustic reflectors upstream and/or downstream of the metering section, as will be described in more detail below.

It should be noted that the tube wave generated by any transmitter propagates in both the upstream and the downstream directions as indicated by the solid wavefronts in the figures. For the wave emitted by the upstream transceiver 11, the signal of interest is the wave propagating with the flow in downstream direction, thus passing the downstream transceiver 12. Conversely, for the wave emitted by the downstream transceiver 12 indicated using dashed wavefronts, the signal of interest is the wave propagating against the flow in upstream direction, thus passing the upstream transceiver 11.

There are two measurements that can be made from this arrangement. First, by comparing the emitting time at the upstream transceiver 11 and the wave arrival time at the downstream transceiver 12, one can obtain a time-of-flight, T1, for the tube wave mode. Because the wave propagation direction is the same as that of the flow, this time can be described as:

$$T_1 = \frac{L}{c_m + V_h} \quad [2]$$

where L is the separation between the transceivers, $c_m$ is the speed of sound in the mixture flow and $V_h$ is the mixture flow velocity or homogeneous flow velocity. Second, when the downstream transceiver 12 is transmitting and the upstream transceiver 11 receiving, one obtains another time-of-flight, T2. In this case the direction of the wave propagation is against the flow, therefore T2 can be described as:

$$T_2 = \frac{L}{c_m - V_h}. \quad [3]$$

The above two measurements, T1 and T2, can be readily combined to derive the flow velocity, $V_h$, and the speed of sound in the mixture fluid, $C_m$, through the following relationships:

$$\frac{1}{T_1} + \frac{1}{T_2} = \frac{2 \cdot c_m}{L}, \quad [4]$$

and $$\frac{1}{T_1} - \frac{1}{T_2} = \frac{2 \cdot V_h}{L}. \quad [5]$$

The signal processor 14 shown in FIG. 1 performs the time-of-flight measurements and derives the homogeneous flow velocity as well as the speed of sound according to Eq. 4 and Eq. 5.

If the velocities of the individual phases in a two-phase flow need to be determined, then according the Eq. 1, two added measurements are needed. One of these is a fraction measurement for $\alpha_g$. Another is a velocity measurement for one of the phases, e.g. the gas phase. Such a velocity may be measured by various techniques, such as ultrasonic Doppler or cross-correlation of pressure, acoustic or electrical capacitance signals. If a slip velocity model for the flow exists, e.g. $V_g/V_o=k$, where k is known, then with only one additional measurement for the phase fraction, $\alpha_g$, both $V_o$ and $V_g$ can be determined from Eq. 1.

Provided that the wavelength of the tube wave is much longer than the sizes of the two-phase structures in the flow, e.g. bubbles, slugs, then the measured speed of sound for the mixture flow, $c_m$, is correlated to the phase fraction according to the Wood equation as published for example by Gudmundsson J. S. and Celius H. K, "Gas-Liquid Metering Using Pressure Pulse Technology", paper SPE 56584, presented at the 1999 SPE Annual Technical Conference and Exhibition, Houston, 3-6 October:

$$\frac{1}{\rho_m \cdot c_m^2} = \frac{\alpha_1}{\rho_1 \cdot c_1^2} + \frac{1-\alpha_1}{\rho_2 \cdot c_2^2} \qquad [6]$$

where $\rho$ is the density, $\alpha$ is the phase fraction and c the speed of sound. The subscripts, m, 1 and 2 in Eq. 6 correspond to the mixture, the first and the second phase in a two-phase flow. The mixture density in Eq. 6 is defined by $$\rho_m = \alpha_1 \cdot \rho_1 + (1-\alpha_1) \cdot \rho_2. \qquad [7]$$

According to Eq. 6 and Eq. 7, in order to derive the phase fraction $\alpha$ from $c_m$, knowledge of the density and the speed of sound of the individual phases at down-hole conditions is required. These parameters can be measured through either a down-hole calibration process or derived from relevant reservoir data or samples with appropriate corrections for pressure, volume and temperature (PVT) from the test environment to the (downhole) location of the flowpipe.

As described above the tube wave generated by a transmitter propagates in both directions upstream and downstream of the transmitter. If there is no acoustic reflector along the flow pipe, then the basic flowmeter described above with reference to FIG. 1 can be used to make the required measurements.

However, in down-hole applications, such as the DST, there may be significant acoustic reflectors, particularly upstream of the metering section. Possible reflections can be generated where there is a significant change of flow pipe diameter, a perforation on the pipe wall or a closed valve at the end of the pipe. These reflections can interfere with the desired signal if they arrive about the same time at the receiver, causing detection difficulties.

For the purpose of the present invention several methods to eliminate the effect of reflections can be applied. One of these is by the physical arrangement of the relative position of the metering section with respect to the positions of the known reflectors.

With $L_u$ in FIG. 1 representing the distance between the upstream transceiver 11 and the first significant reflector upstream, choosing an appropriate $L_u$ can ensure the reflections and the signal are clearly separated in the time domain. For example, by choosing $L_u > L/2 + c_m * T_{pulse}$, where $T_{pulse}$ is the energizing pulse duration applied onto the transmitter and $c_m$ is the upper limit of the sound speed range, the reflection will arrive at the upstream transceiver 11 only after the complete signal from the downstream transceiver 12 has been received by the upstream transceiver 11.

For some downhole applications, if for example the above optimization of the separation is not practical, reflectors may be deliberately introduced near the two transceivers. This makes the reflected arrivals more predictable and can be utilized to the benefit of the signal detection in a way which is illustrated by FIG. 2.

Figure 2:
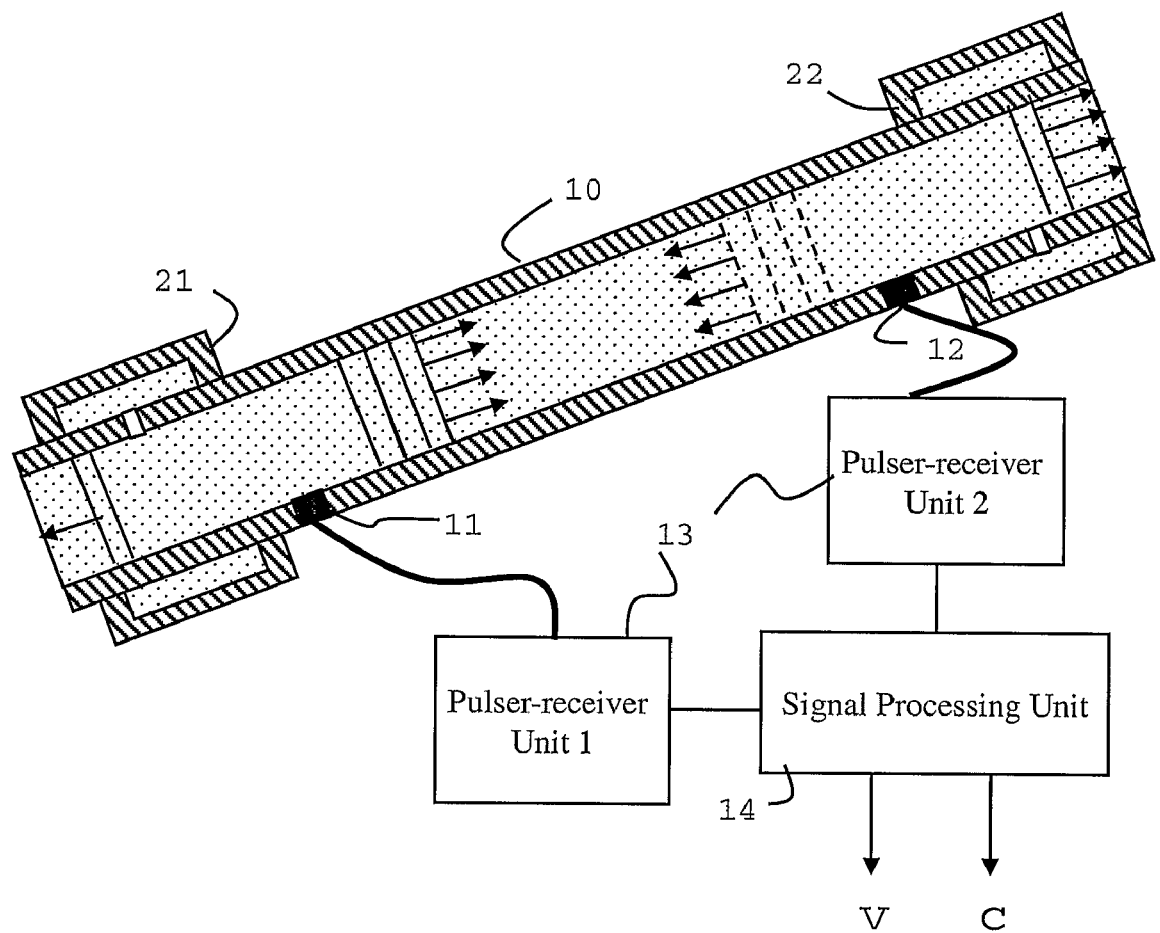
FIG. 2 shows a variant of the invention having noise isolation elements to reflect interferences from the pipe section of the flowmeter.

The example of FIG. 2 has two reflectors 21,22, each in the form of a Helmholtz resonator, deliberately installed near both ends of the metering section. The other elements of FIG. 2 are identical or equivalent to those of FIG. 1 and hence carry the same numerals.

A Helmholtz resonator can be created by a hydraulic volume, typically a few liters, plus at least one narrow tube or orifice that provides a hydraulic or acoustic link between the said volume and the interior of the pipe 10. Such Helmholtz resonators have been proposed before in the signal transmission applications in oilfield flow lines, see for example the co-owned published United States patent application 2006/0109141 A1, and the published international patent applications WO 2004/085796 A1 and WO 2005/024182 A1.

The resonance frequency of the resonator can be designed to match the transmitter frequency. At resonance, the Helmholtz resonator presents a low acoustic impedance. Therefore the waves reflected at the resonator will have a phase inversion of 180-degree. If a resonator is located at about 1 wavelength away from the transmitter, then the reflected wave will appear as a phase inverted signal with a delay of about two wave cycles to the original signal. The superimposition of the two waves forms a new signal that is received by the receiver.

The reflected wave is delayed and phase inverted. Because the resonator is only a partial reflector, i.e. a proportion of the wave energy propagates continuously upstream beyond the resonator, the amplitude of the reflected wave is also smaller than that of the transmitted wave.

Typically, the first two cycles of the wave are not affected by the reflection, i.e. the first arrivals. Therefore it is seen as being well within the scope of a person of ordinary skill in the art of electronic filter design to design a matched filter or cross-correlator to detect the arrival of the signal based on the wave signature of only the first two cycles.

Conversely, when the downstream transceiver 12 is the transmitter and the upstream transceiver 11 the receiver, the waveform received by upstream transceiver 11 is very similar.

There are also various signal processing methods known per se that can be used to cancel the effect of reflection. For instance, adaptive equalization methods used in telecommunications and described for example in Qureshi S., "Adaptive Equalization" IEEE communications magazine, March 1982, pp. 9-16, are effective for reflection cancellation and can be adapted to benefit the present invention.

Further variations of the embodiment of FIG. 1 or 2 can be envisaged to increase the effectiveness of the present invention. For instance, a dedicated transmitter and a dedicated receiver can be used to replace the single transceiver.

The filter 21 shown of FIG. 2 can also be replaced by two or more filters of similar kind. These filters can be arranged one after another along the axial direction of the conduit. Multiple filter stages formed by such an arrangement can enhance noise reduction. Each of these filters would be tuned to a slightly different center frequency to those of others with the stop-bands of the filters overlapping partly with each other to form a combined filter with a wider stop band.

For instance, assuming a single filter has a 50 Hz stop band, this may not be wide enough if the transceiver pulse has a frequency band of 100 Hz, i.e., 50 Hz on either side of a centre frequency, $f_c$. If three filters with center frequencies at $f_c-35$ Hz, $f_c$, and $f_c+35$ Hz, respectively, are used, noise and unwanted reflections within the entire transceiver signal band are attenuated.

As another variation, an array of transceivers separated along the axial direction of the pipe by appropriate distances can be used in place the single transceivers 11,12 of FIGS. 1 and 2.

Figure 3A:
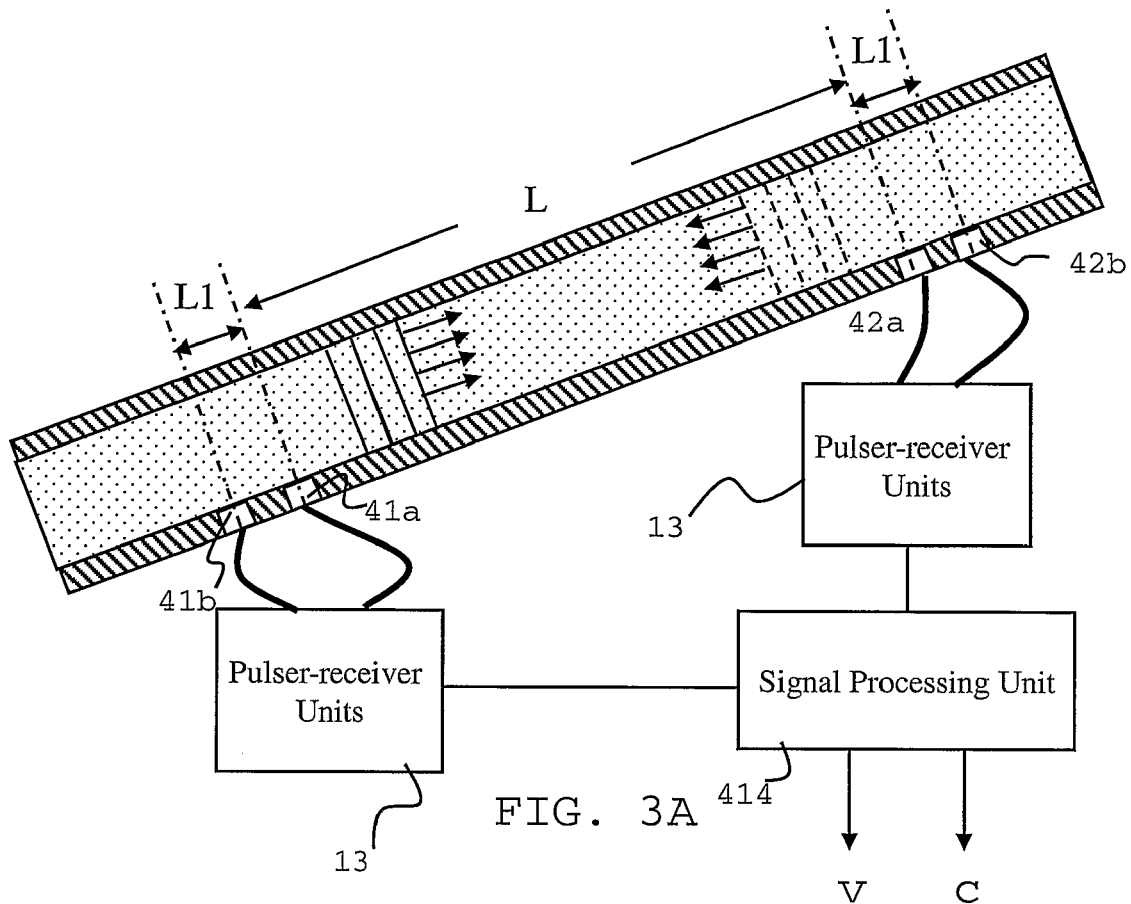
FIG. 3A is another variant of a flowmeter in accordance with the present invention including arrays of transceivers.
Figure 3B:
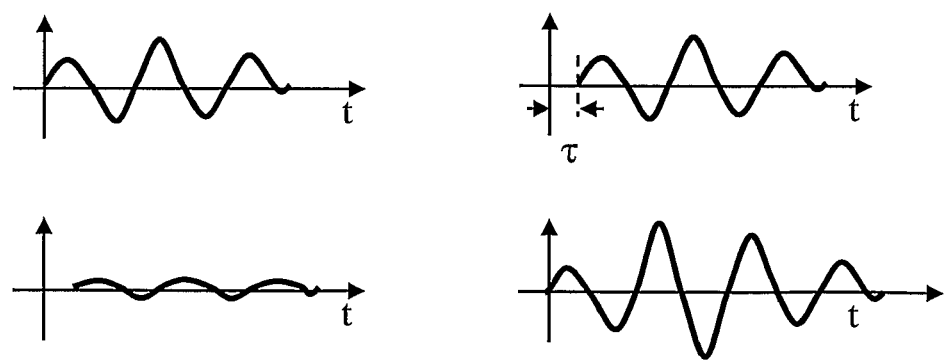
FIG. 3B illustrates waveforms of tube wave traveling through a pipe as generated by the variant of FIG. 3A.

In FIG. 3A and the schematic waveforms of FIG. 3B, there is shown a configuration with two transceivers in each array 41,42. When transmitting a tube wave signal, the energizing waveform is first applied to one of the transmitters, in this example transceiver 41a, and this generates a tube wave that propagates in both upstream and downstream directions. After a delay time, $\tau$, as shown in the upper left panel of FIG. 3B, the same energizing waveform but with a 180-degree inverted phase is applied to the transceiver 41b, which is upstream of the transceiver 41a by a separation of $L_1$ as shown in FIG. 3A. The delay time, $\tau$, is chosen to be the wave travel time from the transceiver 41a to the transceiver 41b.

The tube wave generated by the transceiver 41b also travels in both directions. Upstream of the transceiver 41b, the wave from the transceiver 41a and that from the transceiver 41b have about the same amplitude but opposite phase. Thus, they cancel each other out as indicated by the waveform shown in the bottom right panel of FIG. 3B, and therefore there is no significant wave energy traveling upstream beyond transceiver 41b. For the wave traveling downstream of the transceiver 41a, it is the superimposition of the wave from the transceiver 41a and that from the transceiver 41b delayed by $2\tau$ as the transceiver 41b sends out a pulse with a delay of $\tau$ with respect to the pulse time of transceiver 41a, and adding the delay $\tau$ for propagation from the transceiver 41b to the transceiver 41a, with $$\tau = L_1/c_m. \quad [8]$$

If $L_1$ is chosen to be at least half of the wavelength at fastest $c_m$, then at least the first cycle of the original waveform will be preserved in the downstream traveling wave, which enables signal detection at the transceivers 42a,b. The waveform after the first cycle will be affected by interference effect of the two waves, which may be constructive or destructive depending on the delay $\tau$.

The combined downstream-going waveform is shown in the bottom left panel of FIG. 3B with a separation $L_1$ of a three-quarter wavelength. The first one and half cycle is the original wave from the transceiver 41a. The next wave cycle is the result of interference by the two waves, in this case constructive. The rest of the waveform is from the transceiver 41b. Hence, the first one or two cycles can be used for signal arrival detection.

Preferably, the wavelength, $\lambda$, of the tube wave mode generated in the pipe should be greater than the diameter of the pipe, ideally it should be greater than 5 times of the diameter at the lowest possible speed of sound. For instance, if the lowest speed of sound, e.g. at 20% gas void fraction downhole, is 250 m/s, for a 3" pipe inner diameter, one should choose a wavelength of at least 0.375 m. According to:

$$f = \frac{c}{\lambda}, \quad [9]$$

the central frequency of the driving signal should be f=666 Hz.

Depending on the requirement of the wavelength and the limit to the transmitter-receiver separation, the suitable frequency for this tube wave flowmeter can range from 10 Hz to 10 kHz, but more likely to be between 500 Hz to 2 kHz.

The separation between the transmitter and the receiver, L, is chosen to be at least one longest wavelength but preferably 3 to 6 times of the longest wavelength of the emitted signal. The longest wavelength is obtained when the speed of the sound is the highest. This typically occurs when the flow is 100% oil (or water) and the speed of sound is about 1400 m/s. If the frequency is 666 Hz as in the previous example, then according to Eq. 9, the longest wavelength is 2.1 m. Therefore a separation of L=6.5 m which exceeds three times the longest wavelength is considered adequate for the present example. With such a separation, the whole flowmeter section can be mounted on a single section of downhole tubing as used typically for production purposes. The upstream and downstream transceivers may also be installed on different sections of the tubing string if a more extended length of separation is required, for example for very low frequency applications.

Figure 4:
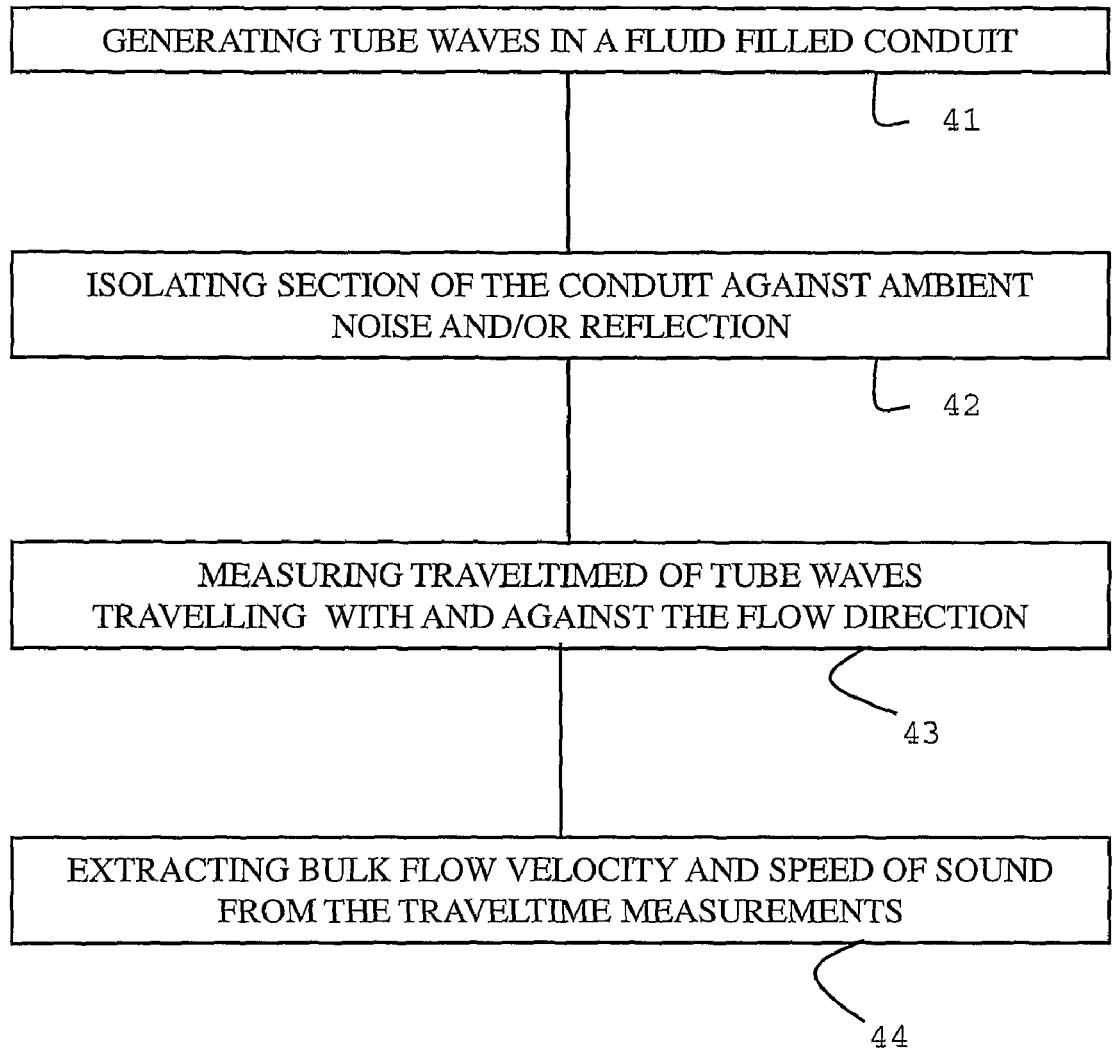
FIG. 4 shows a flowchart listing steps in accordance with an example of the present invention.

Steps outlining the novel method are summarized in FIG. 4. The example includes the step 41 of generating tube waves as defined above and the step 42 of isolating the flowmeter section of the tubing from ambient noise and/or reflections of the generated signal. The traveltime between source and receiver can then be determined (STEP 43) and using the equation given above the bulk flow velocity in the tubing and the speed of sound of the fluid is determined (STEP 44).

While the invention has been described in conjunction with the exemplary embodiments described above, many equivalent modifications and variations will be apparent to those skilled in the art when given this disclosure. For example, it is readily possible to combine the examples of FIGS. 2 and 3 to build a flowmeter better isolated again noise from both, exterior sources and due to reflections of the generated signal.

Furthermore, any known form of arrival time measurement can be applied, such as peak/threshold detection or cross-correlation of the received waveform with the generated waveform. Accordingly, the exemplary embodiments of the invention set forth above are considered to be illustrative and not limiting.

The invention claimed is:

1. A flowmeter having an upstream transceiver and a downstream wave transceiver, each positioned with a wave emitting surface exposed to a fluid flowing in a conduit, the transceiver being separated by a length L along the conduit and adapted to receive wave signals traveling in flow direction and opposite to the flow direction, respectively, and an electronic processor for extracting from travel time measurements of the wave signals flow characterizing parameters, wherein the transceivers are adapted to generate tube waves in the conduit and to determine the travel time of the tube waves between the upstream transceiver and the downstream wave transceiver.

2. The flowmeter of claim 1 wherein the transceivers generate waves with a frequency in the audible acoustic frequency range.

3. The flowmeter of claim 1 wherein the transceivers generate waves with a frequency in the frequency range of 10 Hz-20 KHz.

4. The flowmeter of claim 1 wherein the transceivers generate waves with a frequency in the frequency range of 10 Hz-5 KHz.

5. The flowmeter of claim 1 wherein the transceivers generate waves with a wavelength of 1 to 100 times the characteristic width of the conduit.

6. The flowmeter of claim 5 wherein characteristic width of the conduit is between 2 cm and 50 cm.

7. The flowmeter of claim 1 being insulated from acoustic noise passing through the conduit.

8. The flowmeter of claim 1 being insulated from noise with one or more filters.

9. The flowmeter of claim 1 being insulated from noise with one or more band-stop filters, wherein the band-stop filters include a resonating structure connected to the conduit.

10. The flowmeter of claim 1 being insulated from noise with one or more band-stop filters, wherein the band-stop filters each includes a fluid reservoir connected to the flow in the conduit with an opening.

11. The flowmeter of claim 1 being insulated from noise with one or more Helmholtz resonator filters.

12. The flowmeter of claim 1 wherein the upstream transceivers and/or the downstream transceiver is an array of transceivers.

13. The flowmeter of claim 12 wherein the transceivers within an array of transceivers are tuned to emit mutually delayed waves.

14. The flowmeter of claim 13 wherein the transceivers within an array of transceivers are tuned to emit mutually delayed waves and the delay is adapted to generate destructive interference for wave propagation in directions away from the flowmeter.

15. The flowmeter of claim 14 wherein the processor is adapted to extract from travel time measurements delays applied to transceivers with an array.

16. The flowmeter of claim 12 wherein the transceivers within an array of transceivers operate as a noise canceller in an operating frequency range of the flowmeter.

17. The flowmeter of claim 1 being a downhole flowmeter adapted for operation downhole in a hydrocarbon well.

18. A method of measuring flow characterizing parameters in a conduit by—positioning an upstream transceiver and a downstream wave transceiver with a wave emitting surface exposed to a fluid flowing in the conduit, the transceiver being separated by a length L along the conduit, receiving wave signals traveling in flow direction and opposite to the flow direction, respectively, and extracting from travel time measurements of the wave signals the flow characterizing parameters, characterized by generating tube waves in the conduit and determining the travel time of the tube waves between the upstream transceiver and the downstream wave transceiver.

19. The method of claim 18 wherein generated waves have a mean frequency in the audible acoustic frequency range.

20. The method of claim 18 wherein generated waves have a frequency in the frequency range of 10 Hz-20 KHz.

21. The method of claim 18 wherein generated waves have a frequency in the frequency range of 10 Hz-5 KHz.

22. The method of claim 18 wherein generated waves have a wavelength of 1 to 100 times the characteristic width of the conduit.

23. The method of claim 18 comprising the step of isolating the transducers from noise using one or more filters.

24. The method of claim 18 comprising the step of isolating the transducers from noise with one or more band-stop filters, wherein each of the band-stop filters includes a resonating structure connected to the conduit.

25. The method of claim 18 wherein the transceivers are arrays of transceivers and are tuned to emit mutually delayed waves.

26. The method of claim 18 wherein the transceivers are arrays of transceivers and are tuned to emit mutually delayed waves to generate destructive interference for wave propagation in directions away from the transducers.

* * * * *